Aug. 11, 1959  M. COVEN ET AL  2,898,968
TIRE CHAIN
Filed Aug. 7, 1958

INVENTORS.
MURRAY COVEN
FERDINAND T. WIEHL
BY Frank Mokora
ATTORNEY

United States Patent Office 2,898,968
Patented Aug. 11, 1959

2,898,968
TIRE CHAIN

Murray Coven, Flushing, and Ferdinand T. Wiehl, Brooklyn, N.Y.

Application August 7, 1958, Serial No. 753,691

4 Claims. (Cl. 152—236)

This invention relates to a tire chain and more particularly to individual tire chains for clipping onto the tire wheel as need arises.

It is an object of this invention to provide a tire chain easily and rapidly clipped on to a automobile wheel.

It is another object to provide a tire chain of economical construction.

It is another object to provide a tire chain having co-acting chain clips permanently secured to the tire wheel.

Figure 1:
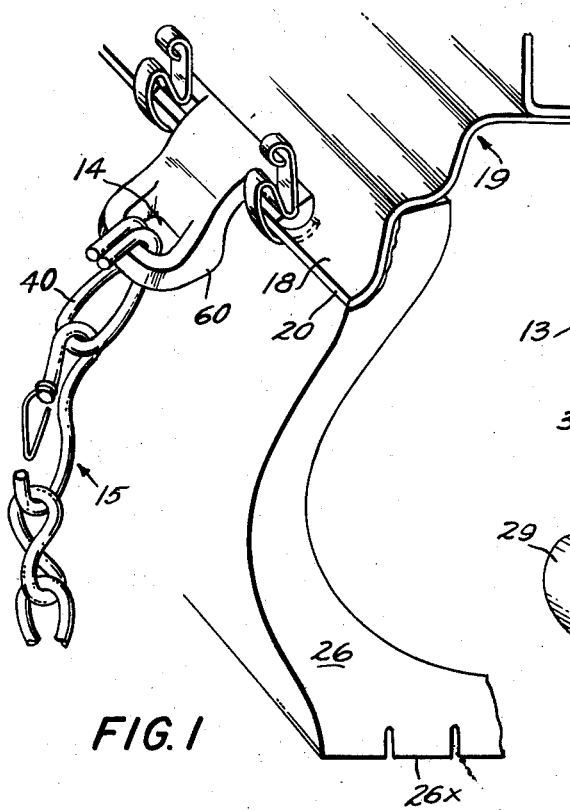

These and other objects of this invention will become apparent upon reading the following descriptive disclosure taken in conjunction with the accompanying drawing in which:

Fig. 1 is a perspective view of one modification of the chain, broken-away in part, secured to a steel tire rim and a rubber tire shown in section.

Figure 3:
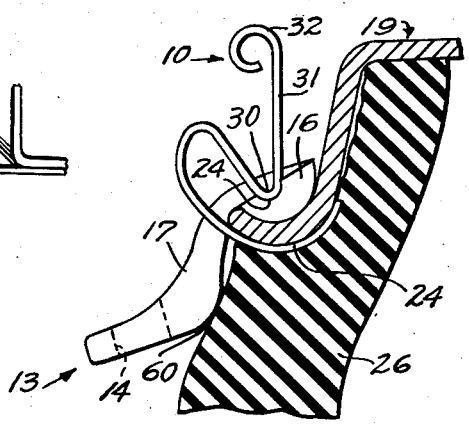
Figure 4:
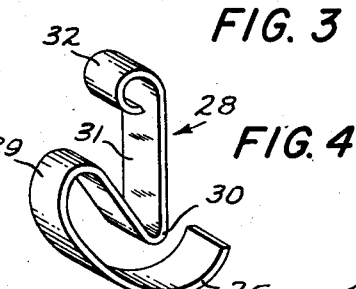
Figure 6:
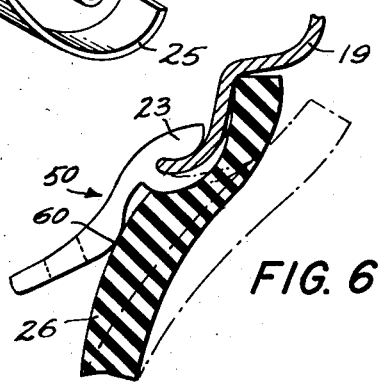
Figure 2:
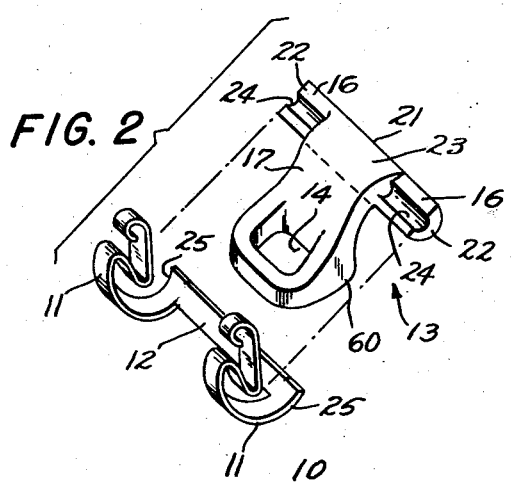
Figure 5:
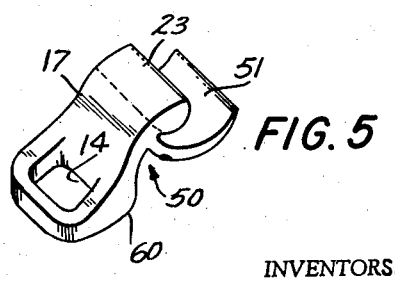

Fig. 2 is an exploded view of the modification of Fig. 1, showing the spring clip and the co-acting holder, Fig. 3 is a side view of the holder and spring clip immoveably secured in place against a steel rim and inflated rubber tire, Fig. 4 is a perspective view of a modified spring useable in the modification of Fig. 1, Fig. 5 is a perspective view of a modified holder for a chain, and Fig. 6 is an end view of the holder of Fig. 5 secured immoveably in place between steel wheel rim and a rubber tire.

In this invention a pair of opposed holder elements for the chain are permanently and immoveably secured in place between the metal wheel rim and the rubber tire and the chain surrounding the rubber tire are attached as needed for mud, ice or snow road conditions.

The holder elements come in identical pairs so that each weighs exactly as much as the other thereby avoiding unbalancing of the wheel. The chains may be used in pairs spaced 180 degrees apart in which case the four holders are secured diametrically opposed to one another, two on each side of the wheel. Where three chains are used three pairs of holders are secured in place 120 degrees apart, ready for receiving a length of chain whenever necessitated by road conditions of mud, snow or ice.

Two modifications of the holder are shown in the drawing. In one holder modification (Figs. 1–4) a holder plate and co-acting spring is used. The spring is secured immoveably in place between the steel wheel rim and a rubber tire by inserting a tongue of the spring between the deflated tire and the rim and thereafter locking the tongue in place immoveably by inflating the tire against the rim. In this two-piece modification of the holder consisting of the holder plate and the holder spring, the plate may be pushed into place just before attaching the chain or preferably the plate is permanently but removeably secured in place between the spring and the steel rim.

In another modification (Figs. 5 and 6) the holder is provided with an integral tongue for securing immoveably between the steel wheel rim and the tire. In this instance the integral tongue is inserted between the steel tire rim and a deflated tire and thereafter the tire is inflated to immoveably secure the holder in place.

Turning now to the modification shown in Figs. 1 to 3, a spring 10 (Fig. 2) is provided with a pair of opposed end clip sections 11 secured integrally to one another by a bridge portion 12. An integral holder plate 13 is provided with an aperture 14 for holding a length of chain 15 and with an integral substantially semi-cylindrical portion 16 suitably spaced above and away from aperture 14 by a holder intermediate inclined portion 17.

The semi-cylindrical holder portion 16 is semi-cylindrical throughout its lower length and engages a co-acting curved top surface 18 of the metal wheel rim 19 adjacent the rim edge 20 (Fig. 3). As shown in the drawing, the top surface of the inclined portion 17 of the holder continues without interruption to the edge 21, of the substantially semi-cylindrical holder portion 16 thereby providing the cylindrical portion with a pair of opposed ears 22. Thus holder portion 16 consists of a pair of opposed ears 22 secured integrally to a medial section 23.

As shown in Fig. 2, the ears 22 are provided with suitable grooves 24 disposed off-center from the axis of the semi-cylindrical section 16.

Turning to Fig. 3, the clip sections 11 are each provided with a tongue 25 which is inserted between the wheel rim 19 and a tire 26 when the tire is deflated. The spring bridge section 12 of clip 10 is so disposed between the clip sections 11 as to be also seized between the rim and the tire.

In place of a spring 10 having opposed clip sections 11, a pair of separate clips 28 (Fig. 4) having the identical structure as clip sections 11 may be used.

The clip sections 11 and clips 28 are provided with a U-shaped bow section 29 integral at one end with spring tongue 25 and ending at its other end in a knee portion 30. An upright spring portion 31 is integral with the knee-portion 30 and its top is provided with a rolled-over edge 32 for easy manipulation by the fingers.

As shown in Fig. 3, the knee portion 30 of the spring clip section 11 is seated into the groove 24 of the top surface of the ears 22 thereby securing the holder 13 to the top of the steel rim 19 with great force since the force of the spring clip knee-portion 30 is disposed vertically downward against the curved wheel rim surface 18 adjacent the rim edge 20 due to the offset relationship of groove 24 relative to the axis of the semi-cylindrical portion 16.

Preferably the width of the spring clip 28 and spring clip sections 11 is equal to the width of the ear portions 22 so that the knee portion 30 engages the groove 24 throughout its entire length.

In use the springs 10 or springs 28 are inserted suitably between the rim 19 and a deflated tire 26 on both the inside and outside opposed edges 20 of a steel wheel rim. Upon inflation, the springs 10 or separately spaced-apart springs 28, are secured immoveably in place between the rim and the tire due to the pressure of the inflated tire against the rim 19. The so altered automobile wheels having springs disposed so as not to unbalance the wheel is used on the automobile all year long. When need arises the holder 13 may be inserted in place as shown in Fig. 3 by pulling the spring portion 32 away from rim 19 and simultaneously sliding the knee portions 30 into groove 24 of said holder. Inasmuch as all holders 13 are made of metal, preferably forged, and weigh the same, the wheel is not unbalanced because of these holders so that the holders may be left in place, if so desired, from year to year.

When snow or other adverse conditions necessitate use of chains a conventional terminal chain link 40 is inserted into an aperture 14 of a holder on the outside surface of the wheel rim 19 (Fig. 1). Then a chain length having another terminal link 40 at one end and a conventional snap at the other end is secured to the inside holder 13 of rim 19 by inserting the terminal link 40 on the chain 15 in the holder aperture and thereafter the chain 15 is pulled across the tire face 26X and snapped by means of snap to the terminal link 40 disposed on the outside of the wheel rim 19. Other conventional chain means of securing a chain to the opposed apertures of opposed holders disposed at right angles to the rim 19 are operable.

In lieu of the two-piece holder of Figs. 1 to 3 a one-piece chain holder is operable.

Turning to Figs. 5 and 6 there is shown a modified one-piece holder 50 having an integral tongue 51. As shown in Fig. 5 the holder 50 is essentially the holder plate 13 without its ears 22 and provided with an integral tongue 51 secured to the holder adjacent the top of the inclined holder portion 17. The tongue 51 functions in much the same manner as does tongues 25 of the springs 10 and 28 being in effect imbedded immoveably between the rim 19 and tire 26 (Fig. 6) in the same manner as for spring tongues 25. Once in place each pair of opposed holders 50 is left in place the year round, ready for receiving a suitable length of tire chain having conventional end clips or hooks for securing in the apertures 14.

A generic feature of this invention is the provision of an angular heel portion 60 on each holder 13 and 50 behind the aperture 14, said heel portion being engaged with increasing force by increasing inflation of tire 26.

Clearly as heel portion 60 is engaged and turned clockwise by tire 26, the semi-cylindrical portion 16 is also turned clockwise and increasingly engages with greater force the surface 18 of rim 19 as it is turned clockwise by movement of the heel portion 60.

This invention is of generic scope and is therefore not to be limited to its illustrative embodiments. Thus, for example, the tire 26 may be a tubed or a tubeless tire.

We claim:

1. A tire chain for automobile wheels comprising a pair of integral holders each having an aperture for receiving a chain element and having a substantially semi-cylindrical portion disposed in spaced-relationship to said aperture, the semi-cylindrical surface of which is adapted to engage the exterior surface of a metal wheel rim adjacent the rim edge, said holder having an abutment intermediate said aperture and said semi-cylindrical portion for engaging with pressure an inflated tire, tongue means engaging said holder and adapted to be disposed immoveably between said metal rim and an inflated tire and a plurality of interconnected chain links secured on each end to a respective holder.

2. The chain of claim 1 wherein the substantially semi-cylindrical portion of the holder is provided with a pair of opposed ears, each ear having a groove disposed in its flat non-cylindrical surface, said tongue means having spaced-apart end spring clips, each having a tongue, said tongues being interconnected by an integral bridge forming also a part of said tongue means disposed immoveably between said metal rim and said rubber tire.

3. The chain of claim 1 wherein said tongue means is integral with said holder and secured to the inner surface thereof in space relationship to said substantially semi-cylindrical portion.

4. A tire chain for automobiles comprising a pair of integral holders each having an aperture, a chain of links having end links adapted to be secured in the respective apertures of said holders, said holders each having a semi-cylindrical portion, an interiorly disposed cylindrical surface which engages a co-acting surface of a metal wheel rim, said semi-cylindrical portion of said holder being spaced laterally and vertically relative to said aperture and provided with grooves at each end in its exteriorly disposed non-cylindrical surface, and an integral spring having end clips secured together by an integral bridge element, said end clips each having a curved tongue portion secured to said bridge element and adapted to be disposed immoveably between a metal wheel rim and a rubber tire, said end clips having also knee portions disposed in spaced relationship to said tongue portions and adapted to engage the spaced apart grooves, respectively, of said semi-cylindrical portion.

References Cited in the file of this patent

UNITED STATES PATENTS

| | | |
|---|---|---|
| 2,074,534 | Briggs | Mar. 23, 1937 |
| 2,344,970 | Copp | Mar. 28, 1944 |
| 2,644,503 | Paske | July 7, 1953 |